US011942076B2

(12) United States Patent
Hu et al.

(10) Patent No.: US 11,942,076 B2
(45) Date of Patent: *Mar. 26, 2024

(54) PHONEME-BASED CONTEXTUALIZATION FOR CROSS-LINGUAL SPEECH RECOGNITION IN END-TO-END MODELS

(71) Applicant: Google LLC, Mountain View, CA (US)

(72) Inventors: Ke Hu, Mountain View, CA (US); Golan Pundak, New York, NY (US); Rohit Prakash Prabhavalkar, Santa Clara, CA (US); Antoine Jean Bruguier, Milpitas, CA (US); Tara N. Sainath, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/651,315

(22) Filed: Feb. 16, 2022

(65) Prior Publication Data

US 2022/0172706 A1 Jun. 2, 2022

Related U.S. Application Data

(63) Continuation of application No. 16/861,190, filed on Apr. 28, 2020, now Pat. No. 11,270,687.

(Continued)

(51) Int. Cl.
*G10L 15/30* (2013.01)
*G10L 15/02* (2006.01)
(Continued)

(52) U.S. Cl.
CPC ............ *G10L 15/063* (2013.01); *G10L 15/02* (2013.01); *G10L 15/187* (2013.01);
(Continued)

(58) Field of Classification Search
None
See application file for complete search history.

(56) References Cited

U.S. PATENT DOCUMENTS 9,613,618 B2 * 4/2017 Chakladar .......... G01C 21/3664
9,966,066 B1 * 5/2018 Corfield ................ G10L 15/142
(Continued)

FOREIGN PATENT DOCUMENTS

| EP | 1693828 A1 | 8/2006 | |
|----|------------|--------|---|
| EP | 1975923 A1 | 10/2008 | |
| EP | 1975923 A1 * | 10/2008 | ............ G10L 15/08 |

OTHER PUBLICATIONS

Patel, Ami, et al. "Cross-lingual phoneme mapping for language robust contextual speech recognition." 2018 IEEE International Conference on Acoustics, Speech and Signal Processing (ICASSP). IEEE, Apr. 2018. (Year: 2018).

(Continued)

*Primary Examiner* — Seong-Ah A Shin
(74) *Attorney, Agent, or Firm* — Honigman LLP; Brett A. Krueger; Grant J. Griffith

(57) ABSTRACT

A method includes receiving audio data encoding an utterance spoken by a native speaker of a first language, and receiving a biasing term list including one or more terms in a second language different than the first language. The method also includes processing, using a speech recognition model, acoustic features derived from the audio data to generate speech recognition scores for both wordpieces and corresponding phoneme sequences in the first language. The method also includes rescoring the speech recognition scores for the phoneme sequences based on the one or more terms in the biasing term list, and executing, using the speech recognition scores for the wordpieces and the rescored speech recognition scores for the phoneme (Continued)

sequences, a decoding graph to generate a transcription for the utterance.

20 Claims, 6 Drawing Sheets

Related U.S. Application Data

(60) Provisional application No. 62/842,571, filed on May 3, 2019.

(51) Int. Cl.
    *G10L 15/06*     (2013.01)
    *G10L 15/187*     (2013.01)
    *G10L 15/193*     (2013.01)
    *G10L 15/28*     (2013.01)
    *G10L 15/32*     (2013.01)
    *G10L 25/30*     (2013.01)

(52) U.S. Cl.
    CPC .......... *G10L 15/193* (2013.01); *G10L 15/285* (2013.01); *G10L 15/32* (2013.01); *G10L 25/30* (2013.01); *G10L 2015/025* (2013.01)

(56) References Cited

U.S. PATENT DOCUMENTS

| | | | | |
|---|---|---|---|---|
| 11,069,353 B1* | 7/2021 | Gao | | G10L 25/78 |
| 11,093,110 B1* | 8/2021 | Bossio | | G10L 15/26 |
| 2004/0078191 A1* | 4/2004 | Tian | | G06F 40/263 |
| | | | | 704/9 |
| 2005/0197835 A1* | 9/2005 | Reinhard | | G10L 15/063 |
| | | | | 704/E15.02 |
| 2005/0197838 A1* | 9/2005 | Lin | | G10L 13/08 |
| | | | | 704/260 |
| 2009/0150153 A1* | 6/2009 | Li | | G10L 13/08 |
| | | | | 704/E15.02 |
| 2013/0103402 A1* | 4/2013 | Chopra | | G10L 15/08 |
| | | | | 704/E15.005 |
| 2014/0006029 A1* | 1/2014 | Stanley | | G09B 19/06 |
| | | | | 704/254 |
| 2014/0372120 A1* | 12/2014 | Harsham | | G10L 15/08 |
| | | | | 704/251 |
| 2016/0104482 A1* | 4/2016 | Aleksic | | G10L 15/1815 |
| | | | | 704/235 |
| 2017/0229124 A1* | 8/2017 | Strohman | | G10L 15/183 |
| 2018/0047385 A1* | 2/2018 | Jiang | | G10L 15/063 |
| 2018/0061402 A1* | 3/2018 | Devaraj | | G10L 15/22 |
| 2018/0233150 A1* | 8/2018 | Gruenstein | | G10L 15/30 |
| 2019/0139540 A1* | 5/2019 | Kanda | | G10L 15/19 |
| 2020/0184959 A1* | 6/2020 | Yasa | | G06F 16/334 |
| 2021/0074295 A1* | 3/2021 | Moreno | | G10L 15/005 |

OTHER PUBLICATIONS

Jun. 24, 2022 Examination Report issued in corresponding European Patent Application No. 20729879.5.
Ke Hu et al: "Phoneme-Based Contextualization for Cross-Lingual Speech Recognition in End-to-End Models", arxiv.org, Cornell University Library, 201 Olin Library Cornell University Ithaca, NY 14853, Jun. 21, 2019 (Jun. 21, 2019).

* cited by examiner

PHONEME-BASED CONTEXTUALIZATION FOR CROSS-LINGUAL SPEECH RECOGNITION IN END-TO-END MODELS

CROSS REFERENCE TO RELATED APPLICATIONS

This U.S. patent application is a continuation of, and claims priority under 35 U.S.C. § 120 from, U.S. patent application Ser. No. 16/861,190, filed on Apr. 28, 2020, which claims priority under 35 U.S.C. § 119(e) to U.S. Provisional Application 62/842,571, filed on May 3, 2019. The disclosure of these prior applications are considered part of the disclosure of this application and are hereby incorporated by reference in their entireties.

TECHNICAL FIELD

This disclosure relates to phoneme-based contextualization for cross-lingual speech recognition in end-to-end models.

BACKGROUND

Recognizing the context of speech is the goal of automatic speech recognition (ASR) systems. The ability to recognize context in speech, however, is challenging given the wide variety of words that people may speak and the many variations in accents and pronunciation. In many cases, the types of words and phrases that a person speaks varies depending on the context the person finds himself or herself in.

Contextual automated speech recognition (ASR) involves biasing speech recognition towards a given context, such as towards a user's own playlist, contacts, or geographic place names. Context information usually includes a list of relevant phrases to be recognized, which often includes rare phrases or even foreign words which are seen infrequently in training. To perform contextual biasing, conventional ASR systems sometimes model contextual information in an independent contextual language model (LM), using an n-gram weighted finite state transducer (WFST), and compose the independent contextual LM with a baseline LM for on-the-fly (OTF) rescoring.

Recently, end-to-end (E2E) models have shown great promise for ASR, exhibiting improved word error rates (WERs) and latency metrics as compared to conventional on-device models. These E2E models, which fold the acoustic model (AM), pronunciation model (PM), and LMs into a single network to directly learn speech-to-text mapping, have shown competitive results compared to conventional ASR systems which have a separate AM, PM, and LMs. Representative E2E models include word-based connectionist temporal classification (CTC) models, recurrent neural network transducer (RNN-T) models, and attention-based models such as Listen, Attend, and Spell (LAS). Because E2E models maintain a limited number of recognition candidates during beam-search decoding, contextual ASR can be challenging for E2E models

SUMMARY

One aspect of the disclosure provides a method for biasing speech recognition results toward terms present in a biasing term list. The method includes receiving, at data processing hardware, audio data encoding an utterance spoken by a native speaker of a first language, and receiving, at the data processing hardware, a biasing term list including one or more terms in a second language different than the first language. The method also includes processing, by the data processing hardware, using a speech recognition model, acoustic features derived from the audio data to generate speech recognition scores for both wordpieces and corresponding phoneme sequences in the first language. The method also includes rescoring, by the data processing hardware, the speech recognition scores for the phoneme sequences based on the one or more terms in the biasing term list. The method also includes executing, by the data processing hardware, using the speech recognition scores for the wordpieces and the rescored speech recognition scores for the phoneme sequences, a decoding graph to generate a transcription for the utterance.

Implementations of the disclosure may include one or more of the following optional features. In some implementations, rescoring the speech recognition scores for the phoneme sequences comprises using a biasing finite-state transducer (FST) to rescore the speech recognition scores for the phoneme sequences. In these implementations, the method may also include: tokenizing, by the data processing hardware, each term in the biasing term list into a corresponding phoneme sequence in the second language; mapping, by the data processing hardware, each corresponding phoneme sequence in the second language to a corresponding phoneme sequence in the first language; and generating, by the data processing hardware, the biasing FST based on each corresponding phoneme sequence in the first language.

In some examples, the speech recognition model includes an end-to-end, wordpiece-phoneme model. In a particular example, the end-to-end, wordpiece-phoneme model includes a recurrent neural network-transducer (RNN-T).

In some implementations, during executing of the decoding graph, the decoding graph biases the transcription to favor any of the one or more terms in the biasing term list. The speech recognition model may be trained on training utterances in the first language only. Additionally, none of the terms in the biasing term list may be used to train the speech recognition model.

The data processing hardware and the speech recognition model may reside on a user device or a remote computing device in communication with the user device. When the data processing hardware and the speech recognition model reside on the remote computing device, receiving the audio data encoding the utterance may include receiving the audio data encoding the utterance from the user device.

Another aspect of the disclosure provides a system for biasing speech recognition results toward terms present in a biasing term list. The system includes data processing hardware and memory hardware in in communication with the data processing hardware and storing instructions that when executed on the data processing hardware cause the data processing hardware to perform operations. The operations include receiving audio data encoding an utterance spoken by a native speaker of a first language, receiving a biasing term list comprising one or more terms in a second language different than the first language, and processing, using a speech recognition model, acoustic features derived from the audio data to generate speech recognition scores for both wordpieces and corresponding phoneme sequences in the first language. The operations also include rescoring the speech recognition scores for the phoneme sequences based on the one or more terms in the biasing term list, and executing, using the speech recognition scores for the wordpieces and the rescored speech recognition scores for the phoneme sequences, a decoding graph to generate a transcription for the utterance.

This aspect may include one or more of the following optional features. In some implementations, rescoring the speech recognition scores for the phoneme sequences comprises using a biasing finite-state transducer (FST) to rescore the speech recognition scores for the phoneme sequences. In these implementations, the operations may also include: tokenizing each term in the biasing term list into a corresponding phoneme sequence in the second language; mapping each corresponding phoneme sequence in the second language to a corresponding phoneme sequence in the first language; and generating the biasing FST based on each corresponding phoneme sequence in the first language.

In some examples, the speech recognition model includes an end-to-end, wordpiece-phoneme model. In a particular example, the end-to-end, wordpiece-phoneme model includes a recurrent neural network-transducer (RNN-T).

In some implementations, during executing of the decoding graph, the decoding graph biases the transcription to favor any of the one or more terms in the biasing term list. The speech recognition model may be trained on training utterances in the first language only. Additionally, none of the terms in the biasing term list may be used to train the speech recognition model.

The data processing hardware and the speech recognition model may reside on a user device or a remote computing device in communication with the user device. When the data processing hardware and the speech recognition model reside on the remote computing device, receiving the audio data encoding the utterance may include receiving the audio data encoding the utterance from the user device.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Implementations herein are directed toward enhancing a contextual automated speech recognition (ASR) model to recognize foreign words by, among other operations, mapping a foreign language phoneme set to a phoneme set for a language (e.g., American English) of the ASR model to enable modeling of foreign words in a phoneme-level, biasing finite state transducer (FST). Further implementations are directed toward the ASR model incorporating a wordpiece-phoneme model that includes wordpieces and phonemes for the language (e.g., American English) of the ASR model in the modeling space. By way of example, the contextual ASR model is configured to decode a spoken utterance using a wordpiece-phoneme model and a contextual biasing FST to contextually bias a transcription of the utterance toward one or more foreign words. For example, an American English speaker may speak an utterance "Directions to Créteil" in which the word Créteil is a French word, and the contextual ASR model, leveraging the wordpiece phoneme model and contextual biasing FST, may bias the transcription to recognize the foreign word Créteil even though the contextual ASR model was never trained on any words in languages other than American English. In this example, the foreign word Créteil may be one of multiple French words contained in a biasing word list based on a current context. For instance, if the user is presently located in France and driving, the current context may indicate that French city/region names are relevant, and thus, the contextual ASR model may bias toward these French city/region names.

Figure 1:
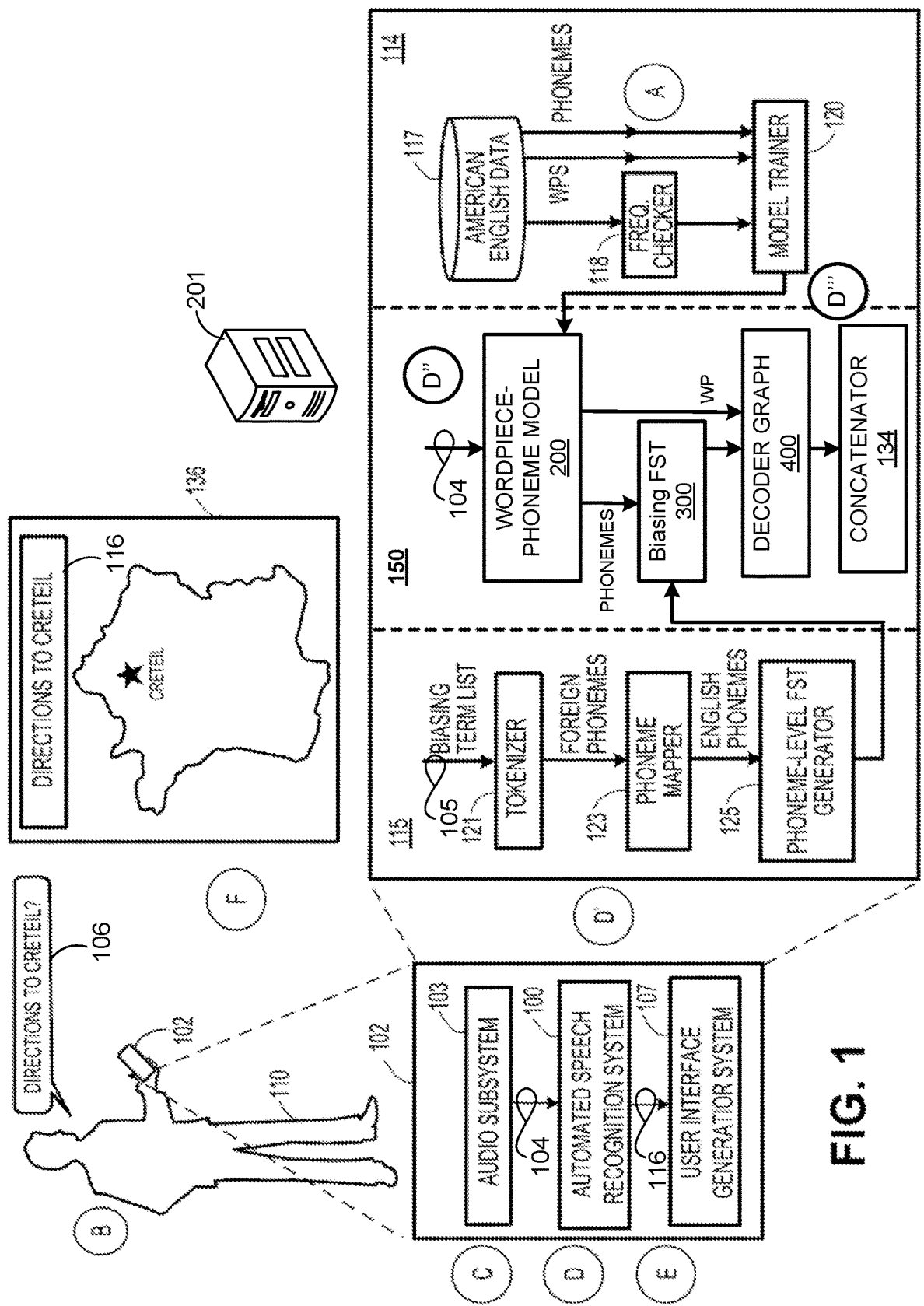
FIG. 1 is a schematic view of an example automatic speech recognition system including a speech recognition model that biases speech recognition results toward terms present in a biasing term list.

Referring to FIG. 1, in some implementations, an enhanced ASR system 100 is enhanced to recognize foreign words. In the example shown, the ASR system 100 resides on a user device 102 of a user 110 and/or on a remote computing device 201 (e.g., one or more serves of a distributed system executing in a cloud-computing environment) in communication with the user device. Although the user device 102 is depicted as a mobile computing device (e.g., a smart phone), the user device 102 may correspond to any type of computing device such as, without limitation, a tablet device, a laptop/desktop computer, a wearable device, a digital assistant device, a smart speaker/display, a smart appliance, an automotive infotainment system, or an Internet-of-Things (IoT) device.

The user device 102 includes an audio subsystem 103 configured to receive an utterance 106 spoken by the user 104 (e.g., the user device 102 may include one or more microphones for recording the spoken utterance 106) and convert the utterance 106 into a corresponding digital format associated with parameterized input acoustic frames 104 capable of being processed by the ASR system 100. In the example shown, the user speaks a respective utterance 106 for the phrase "'Directions to Créteil" and the audio subsystem 108 converts the utterance 106 into corresponding acoustic frames 104 for input to the ASR system 100. For instance, the acoustic frames 104 may be a series of parameterized input acoustic frames that each include 80-dimensional log-Mel features, computed with a short, e.g., 25 ms, window and shifted every few, e.g., 10, milliseconds.

Thereafter, the ASR system 100 receives, as input, the acoustic frames 104 corresponding to the utterance 106, and generates/predicts, as output, a corresponding transcription (e.g., recognition result/hypothesis) 116 for the utterance 106. In the example shown, the user device 102 and/or the remote computing device 201 also executes a user interface generator 107 configured to present a representation of the transcription 116 of the utterance 106 to the user 104 in a user interface 136 of the user device 102. In some examples, the user interface 136 may be displayed on a screen in communication with the user device 102.

In some configurations, the transcription 116 output from the ASR system 100 is processed, e.g., by a natural language understanding (NLU) module executing on the user device 102 or the remote computing device 201, to execute a user command. Additionally or alternatively, a text-to-speech system (e.g., executing on any combination of the user device 104 or the remote computing device 201) may convert the transcription into synthesized speech for audible output by another device. For instance, the original utterance 106 may correspond to a message the user 104 is sending to a friend in which the transcription 116 is converted to synthesized speech for audible output to the friend to listen to the message conveyed in the original utterance 106.

The enhanced ASR system 100 includes a biasing component 115, a speech recognizer 150 having a wordpiece-phoneme model 200 and a biasing FST 300, and a training component 114. The biasing component 115 is configured to generate the biasing FST 300 and the training component 114 is configured to train the wordpiece-phoneme model 200 and the biasing FST 300 to perform contextual biasing by rescoring foreign words at the phoneme level. As will become apparent, the speech recognizer 150 performs contextual speech recognition by biasing toward foreign words using the trained, wordpiece-phoneme model 200 and the biasing FST 300.

The training component 114 includes a lexicon 117 having a corpus of text in a single language, e.g., American English, a frequency checker 118, and a model trainer 120. The frequency checker 118 is configured to determine a relative frequency of terms in the single language among the text of the corpus, while the model trainer 120 is configured to train the wordpiece-phoneme model 200 based on both wordpieces and phonemes of the terms in the text corpus, to include both wordpieces and phonemes in the modeling space. In some examples, the wordpiece-phoneme model 200 is trained end-to-end by the model trainer 120 using training data that includes wordpiece-phoneme sets from a single language only, e.g., American English, and excludes wordpiece-phoneme sets from other languages. The model trainer 120 may employ a word-frequency based sampling strategy to randomly tokenize rare words into phonemes in a target sequence using the lexicon 117. At stage A, the training component 114 trains the wordpiece-phoneme model 200 using text from the lexicon 117.

In some examples, the lexicon 117 contains around half of a million words, with their frequencies being used to determine when to use phoneme sequences. The lexicon 117 contains words and their frequencies from training data, and is trimmed by removing homophones (e.g. "flower" and "flour"), homographs (e.g. "live" as a verb or adjective), and pronunciation variants (e.g. "either"). The lexicon 117 thus only contains entries that are unambiguous when going from spelling to pronunciation or the other way around.

In some implementations, the model trainer 120 divides training input utterances into 25-ms frames, windowed and shifted at a rate of 10 ms. An 80-dimensional log-Mel feature is extracted at each frame, and the current frame and two frames to the left are concatenated to produce a 240 dimensional log-Mel feature. These features are then downsampled at a rate of 30 ms.

In some implementations, the wordpiece-phoneme model 200 includes a sequence-to-sequence model. In some examples, the wordpiece-phoneme model 200 includes a Recurrent Neural Network-Transducer (RNN-T) sequence-to-sequence model architecture. In other examples, the model 200 includes a Listen, Attend, Spell sequence to sequence model architecture.

The wordpiece-phoneme model 200 differs from a word-piece-only model in that a few words may selectively be decomposed to phonemes in training. The output of the model is a single softmax whose symbol set is the union of wordpiece and phoneme symbols. A pronunciation lexicon is used to obtain phoneme sequences of words. Since phonemes show strength in recognizing rare words, these words are presented as phonemes more often. In a target sentence, the $i^{th}$ word is randomly presented as phonemes with a probability $p(i)=p_0 \cdot \min(T/c(i), 1.0)$ where $p_0$ and $T$ are constants and $c(i)$ is an integer representing the number of time the word appears in our entire training corpus. The words that appear T times or less will be presented as phonemes with probability $p_0$. For words that appear more than T times, the more frequent they are, the less likely they are presented as phonemes. In some examples, T is equal to 10 and $p_0$ is equal to 0.5, but in other examples different values can be chosen. Note that the decision of whether to use wordpieces or phonemes is made randomly at each gradient iteration, and thus a given sentence could have different target sequences at different epochs. In some implementations, phonemes are context-independent phonemes.

Figure 2:
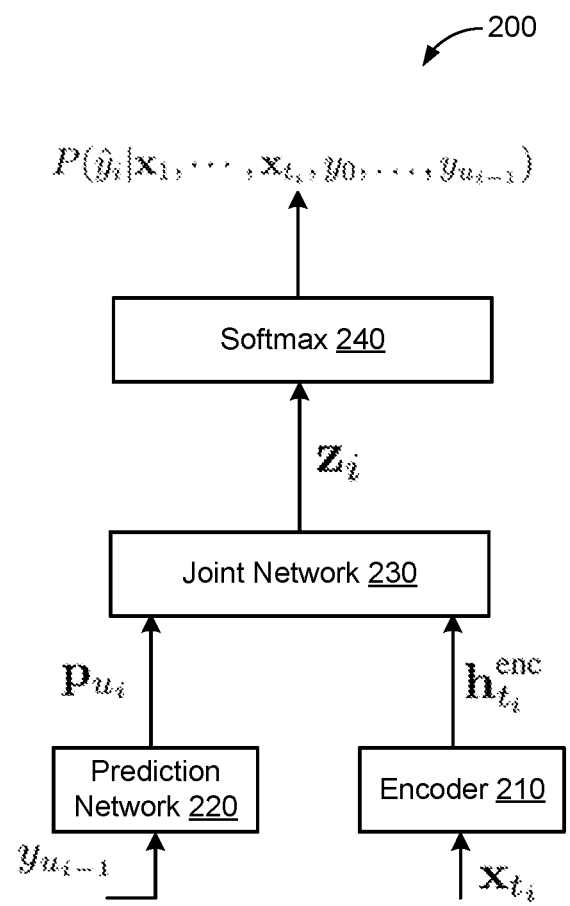
FIG. 2 is a schematic view of an example architecture of the speech recognition model of FIG. 1.

With reference to FIG. 2, the wordpiece-phoneme model 200 may include an end-to-end (E2E), RNN-T model 200 which adheres to latency constrains associated with interactive applications. The RNN-T model 200 provides a small computational footprint and utilizes less memory requirements than conventional ASR architectures, making the RNN-T model architecture suitable for performing speech recognition entirely on the user device 102 (e.g., no communication with a remote server is required). The RNN-T model 200 includes an encoder network 210, a prediction network 220, and a joint network 230. The encoder network 210, which is roughly analogous to an acoustic model (AM) in a traditional ASR system, includes a recurrent network of stacked Long Short-Term Memory (LSTM) layers. For instance the encoder reads a sequence of d-dimensional feature vectors (e.g., acoustic frames 104 (FIG. 1)) $x=(x_1, x_2, \ldots, x_T)$, where $x_t \in \mathbb{R}_d$, and produces at each time step a higher-order feature representation. This higher-order feature representation is denoted as $h_1^{enc}, \ldots, h_T^{enc}$.

Similarly, the prediction network 220 is also an LSTM network, which, like a language model (LM), processes the sequence of non-blank symbols output by a final Softmax layer 240 so far, $y_0, \ldots, y_{ui-1}$, into a dense representation $Pu_i$. Finally, with the RNN-T model architecture, the representations produced by the encoder and prediction networks 210, 220 are combined by the joint network 230. The joint network then predicts $P(y_i|x_1, \ldots, x_{t_i}, y_0, \ldots, y_{u_{i-1}})$, which is a distribution over the next output symbol. Stated differently, the joint network 230 generates, at each output step (e.g., time step), a probability distribution over possible speech recognition hypotheses. Here, the "possible speech recognition hypotheses" correspond to a first set of output labels each representing a symbol/character in a specified natural language and a second set of output labels each representing a phoneme in the specified natural langauge. Accordingly, the joint network 230 may output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols) in the first set and phonemes in the second set, but the set of output labels is not so limited. The output distribution of the joint network 230 can include a posterior probability value for each of the different output labels. Thus, if there are 100 different output labels representing different graphemes or other symbols, the output yl of the joint network 230 can include 100 different probability values, one for each output label. The probability distribution can then be used to select and assign scores to candidate orthographic elements (e.g., graphemes, wordpieces, words, phonemes) in a beam search process (e.g., by the Softmax layer 240) for determining the transcription 11.

The Softmax layer 240 may employ any technique to select the output label/symbol with the highest probability in the distribution as the next output symbol predicted by the model 200 at the corresponding output step. In this manner, the RNN-T model 200 does not make a conditional independence assumption, rather the prediction of each symbol is conditioned not only on the acoustics but also on the sequence of labels output so far. The RNN-T model 200 does assume an output symbol is independent of future acoustic frames 110, which allows the RNN-T model to be employed in a streaming fashion.

In some examples, the encoder network 210 of the RNN-T model 200 is made up of eight 2,048-dimensional LSTM layers, each followed by a 640-dimensional projection layer. A time-reduction layer with the reduction factor of two may be inserted after the second LSTM layer of the encoder to reduce model latency. The prediction network 220 may have two 2,048-dimensional LSTM layers, each of which is also followed by 640-dimensional projection layer. Finally, the joint network 230 may also have 640 hidden units, followed by a 4,096 softmax output. Specifically, the output units contain 41 context-independent phonemes and the rest are wordpieces.

Referring back to FIG. 1, the biasing component 115 of the ASR system 100 includes a tokenizer 121 configured to token terms from a biasing term list 105 in a foreign language that are to be biased into foreign phonemes, a phoneme mapper 123 configured to map the foreign phonemes of the tokenized terms into similar phonemes that are associated with the single language, e.g., American English. The phoneme mapper 123 may be represented by a dictionary which contains human generated source-language to target-language phoneme pairs, and the X-SAMPA phoneme set is used for all languages. Notably, the phoneme mapper 123 is useful when the wordpiece-phoneme model 200 contains only phonemes that are associated with a single language, e.g., American English.

For example, given the utterance 106 for a navigation query "directions to Créteil" and the assumption that the French word "Créteil" is in the biasing term list 105, "Créteil" is first tokenized by tokenizer 121 to French phonemes as "k R e t E j", and then mapped by the phoneme mapper 123 to English phonemes "k r\E t E j" for use in generating the phoneme-level, biasing FST 300. The phoneme mapping is used since the wordpiece-phoneme model 200 includes only phonemes from a single language, e.g., American English, as modeling units.

The present disclosure is not limited to what terms are included in the biasing term list 105, or how the terms are selected for inclusion in the biasing term list 105. The biasing term list 105 may dynamically update based on a relevant context. For instance, context information may indicate that what applications are open and in use on the user device 104, contact names from a contact list of the user, artist/album names in the user's 110 media library, a location of the user 110, etc. For instance, the user 102 may speak American English, and based on context information indicating a navigation/map application is open on the user device 102 and the location of the user 102 is in France, the biasing term list 105 may include terms associated with city and/or region names in France.

The biasing component 115 also includes a phoneme-level, biasing FST generator 125 configured to generate the biasing FST 300 based on phoneme sequences in the native language (e.g., American English) that represent each of the foreign language (e.g., French) terms in the biasing term list 105. In some examples, the biasing generator 125 uses weight pushing to assign weights at the phoneme level, and adds failure arcs to avoid over-biasing. In some implementations, in decoding, all biasing words are used to construct a contextual FST with each arc having the same weight. These weights may be tuned independently for different models.

The speech recognizer 200 uses the biasing FST 300 generated by the biasing component 115 to rescore phonemes output by the wordpiece-phoneme model 200, while a decoder graph 400 consumes the rescored phonemes from the biasing FST 300 and wordpieces output by the wordpiece-phoneme model 200 to generate wordpieces for inclusion in the transcription 116. The decoder graph 400 may correspond to a beam search decoding process that determines one or more candidate transcriptions for the utterance 106.

In some examples, during decoding by the model 200, the biasing FST 300 may consume English phoneme symbols output by the wordpiece-phoneme model 200 and produces wordpieces, using the foreign lexicon and phoneme mapping, i.e. "k r\ E t E j"→Créteil. Wordpieces that are output by the decoder graph 400 are concatenated by concatenator 134 into words of the transcription 116 that are output to other components of the user device 102, for example to the user interface generator 107 or to other natural language processing components.

Figure 3:
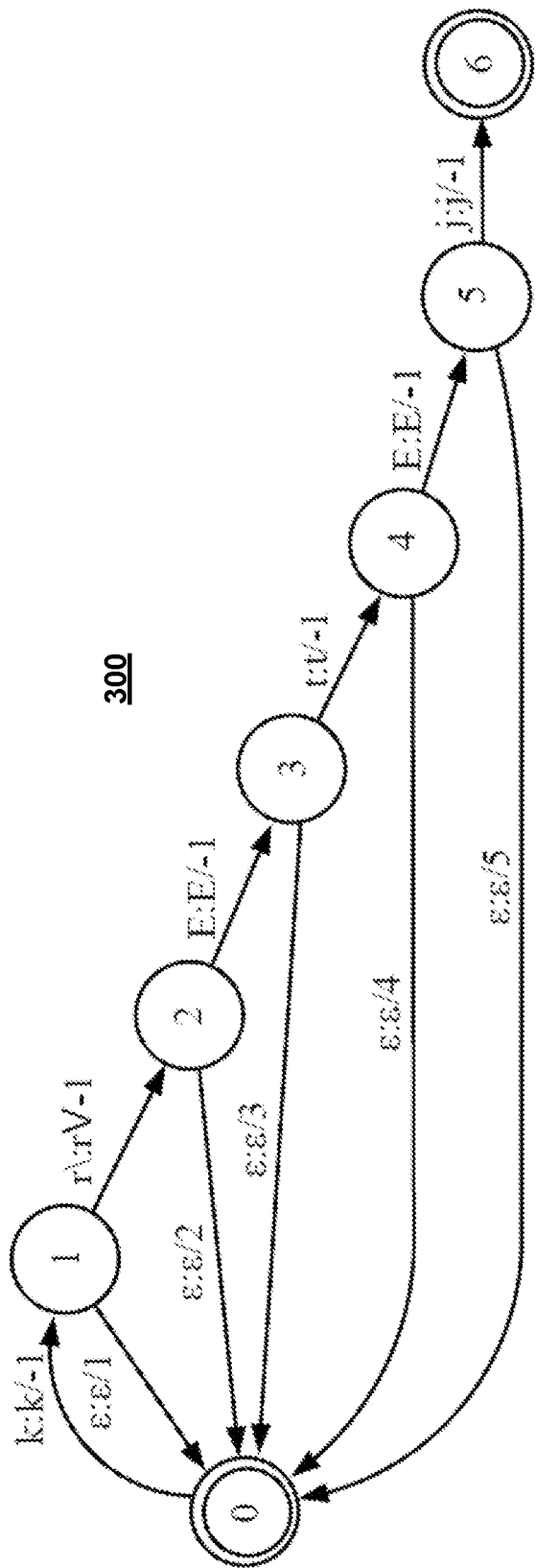
FIG. 3 is a schematic view of an example biasing finite-state transducer.

FIG. 3 shows an example biasing FST 300 for the word "Créteil" at the phoneme level. The biasing FST is then used to rescore the phoneme outputs of the wordpiece-phoneme model on the fly, using Equation (1), below:

$$y^* = \underset{y}{\mathrm{argmax}} \log P(y \mid x) + \lambda \log P_C(y) \tag{1}$$

In Equation (1), x denotes acoustic observations, y denotes the subword unit sequence, P denotes the probability estimation from the E2E model, and $P_c$ is the biasing rescoring probability. $\lambda$ controls the weight of contextual LM in rescoring.

Referring back to FIG. 1, the wordpiece-phoneme model 200 incorporates phonemes as well as wordpieces as modeling units, and uses the biasing FST 300 for contextual biasing toward foreign language terms in the biasing term list 120. By contrast to an all-phoneme model, the wordpiece-phoneme model 200 modeling both phonemes and wordpieces mitigates regressions on recognizing regular words.

After the model 200 is trained at stage A, at stage B, the user 110 speaks to the device 102 the utterance 106 "directinos to Créteil." At stage C, the audio subsystem 103 receives, e.g., using a microphone, the utterance, and converts the received utterance to a series of parameterized input acoustic frames 104. For example, the parameterized input acoustic frames 104 may each include 80-dimensional log-Mel features, computed with a short, e.g., 25 ms, window and shifted every few, e.g., 10, milliseconds.

At stage D, the ASR system 100 processes the parameterized input acoustic frames as described above, and outputs a contextually biased transcription 116, i.e., the text "directions to Créteil". At stage E, the user interface generator system 107 generates computer code for a graphical user interface 136 that includes a representation of the transcription, and transmits that computer code to the mobile device 102 for display on user interface 136, at stage F.

Additional details performed by the ASR system 100 may occur during stage D. For instance, during stage D', the biasing component 115 generates a biasing FST 300 based on receiving the list of biasing terms 120 that includes the term "Créteil." At stage D'', the trained wordpiece-phoneme model 200 of the speech recognizer 150 generates speech recognition scores for both wordpieces and corresponding phoneme sequences based on the utterance 106 of the user 110, the speech recognition scores for the phonemes being rescored and remapped by the biasing FST 300 and the wordpieces and rescored/remapped phonemes consumed by the decoder graph 400 to generate wordpieces for output in the transcription 116, at stage D'''. The decoder graph 400 and concatenator 134 generates the contextually biased transcription 116, and provides the transcription for output, e.g., to the user interface generator system 107 for display in a GUI 136 of the user device 102. Notably, the decoder graph 400 executes after the biasing FST 300 rescores the phoneme sequences that correspond to any of the terms in the biasing term list 105. As such, word pieces having low speech recognition scores that correspond to foreign words in the biasing term list 105 are not pruned prematurely.

During testing, the speech recognizer 150 employing the wordpiece-phoneme model 200 and the biasing FST 300 to contextually bias recognition results toward terms in a biasing term list 120 has been shown to successfully recognize foreign words with a WER rate that is markedly better than both grapheme-only biasing models and wordpiece-only biasing models. The wordpiece-phoneme model 200 also has the advantage that it can be directly applied to other foreign languages for biasing without model scalability issues.

Figure 4:
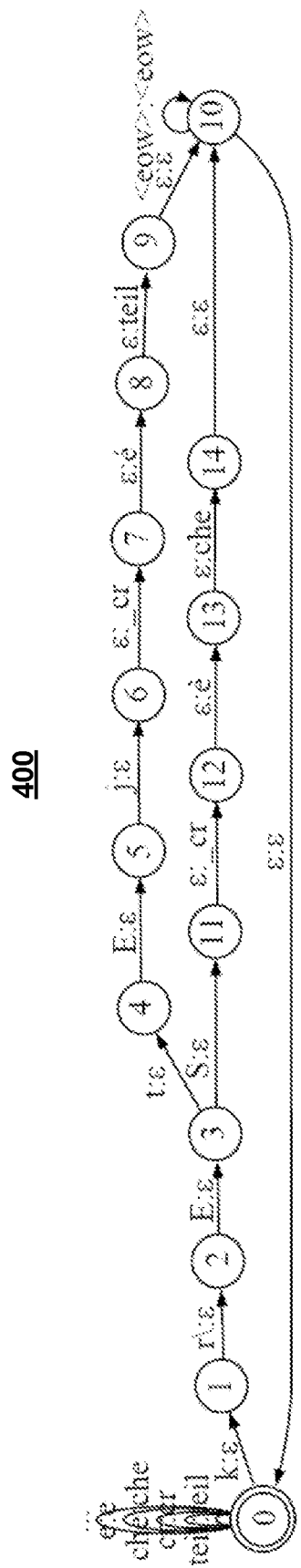
FIG. 4 is a schematic view of an example decoding graph based on wordpieces and corresponding phoneme sequences.

FIG. 4 shows an example decoding graph 400 that the speech recognizer 150 executes to contextually-bias speech recognition results. Specifically, the example decoding graph 400 depicts decoding for the words "crèche" ("daycare," in English) with English cross lingual pronunciation "k r\ E S" and "créteil" (a city in France) with pronunciation "k r\ E t E j". For clarity, most wordpieces for the state 0 are omitted.

The decoding graph 400 is configured to receive, as input, both phonemes and wordpieces output from the wordpiece-phoneme model 200. The speech decoding process searches the decoding graph 400 to generate words as outputs. In the example shown, a decoding FST has wordpiece loops around state 0, but also has a pronunciation FST, i.e., states one (1) through fourteen (14), which includes a prefix tree with phonemes as inputs and corresponding wordpieces as outputs. The pronunciation FST is constructed using the same pronunciations used in biasing for all biasing terms. The final output symbols, which are always wordpieces, are concatenated (e.g., by the concatenator 134 of FIG. 1) into words.

The decoding graph 400 of FIG. 4 provides two additional improvements to an overall decoding strategy. First, given the nature of the decoding graph 400, it is possible that there are several hypotheses that consume the same inputs with the same costs, but do not have the same outputs. For example, a hypothesis that ends at state 7 would have the same cost as the one that ends at state 9. This causes issues because the beam gets filled up by many hypotheses that are all equivalent. The enhanced ASR techniques described in this specification thus prune to beam by only keeping the hypothesis that ends at state 9.

The second improvement relates to merged paths. Given the nature of the training and decoding, a given word can be output either directly in wordpieces, or transduced from phonemes to wordpieces. Equivalent hypotheses are tracked and recombined by adding their probabilities, assigning the total probability to the most likely hypothesis, and dropping the others from the beam.

Testing has been performed to compare the biasing results of the wordpiece-phoneme model 200 to a grapheme-only model and a wordpiece-only model. The latter two models have the same structure as the wordpiece-phoneme model 200, the difference being that the grapheme model has 76 graphemes as outputs and the wordpiece model has 4,096 wordpieces. This difference leads to around 117M and 120M parameters for the grapheme model and wordpiece model, respectively. Note that the two model's output symbols are in English and they are trained using all-English data. For these two models, biasing is done at the grapheme level or wordpiece level alone using the English transliterated versions of French biasing words.

In general, the testing indicates that all three models perform similarly without biasing. This is because the place names are in French and they have never been seen in training, i.e. a word OOV rate of nearly 100%. Furthermore, all models perform substantially better with biasing. The WER reductions are significant when compared to the no-bias case.

Comparing different biasing strategies, the wordpiece-phoneme model 200 demonstrated the best performance, operating significantly better than both the grapheme model, and the wordpiece model. Superior performance of the wordpiece-phoneme model is attributed to the robustness of phonemes to OOV words. Since the wordpiece-phoneme model 200 contains both wordpieces and phonemes as modeling units, wordpiece biasing can be performed in addition to phoneme-based biasing by building a wordpiece FST in addition to the phoneme FST. The addition of this wordpiece FST has been demonstrated to further reduce WER, showing that that wordpiece biasing and phoneme biasing are complementary to each other. The weights that are used for both phoneme and wordpiece biasing may be the same or different. Observations have shown that wordpieces may perform better than graphemes because of sparsity issues in matching longer units.

Testing has shown that biasing can help in recognizing foreign place names. For instance, biasing helps produce the correct French words, and in contrast, phonetically similar but wrong English words are produced when without biasing. Errors made are often due to phonetically similar words in French.

To better ensure there is no regression in no-biasing scenarios, the three models were compared for decoding regular English utterances. In decoding, the biasing mechanism was turned off by using an empty list of biasing phrases. Testing has shown that the wordpiece model performs better than the grapheme model. The wordpiece-phoneme model performs a little better than the grapheme model, which may be attributed to the higher frequency of wordpieces during training. Compared to the wordpiece model, the wordpiece-phoneme model has a very slight degradation. This is due to the introduction of phones in modeling. One potential approach to improve regression is to incorporate an English external language model for phonemes in rescoring, similarly to the wordpiece-based rescoring. However, the regression is significantly smaller than the all-phoneme model.

Figure 5:
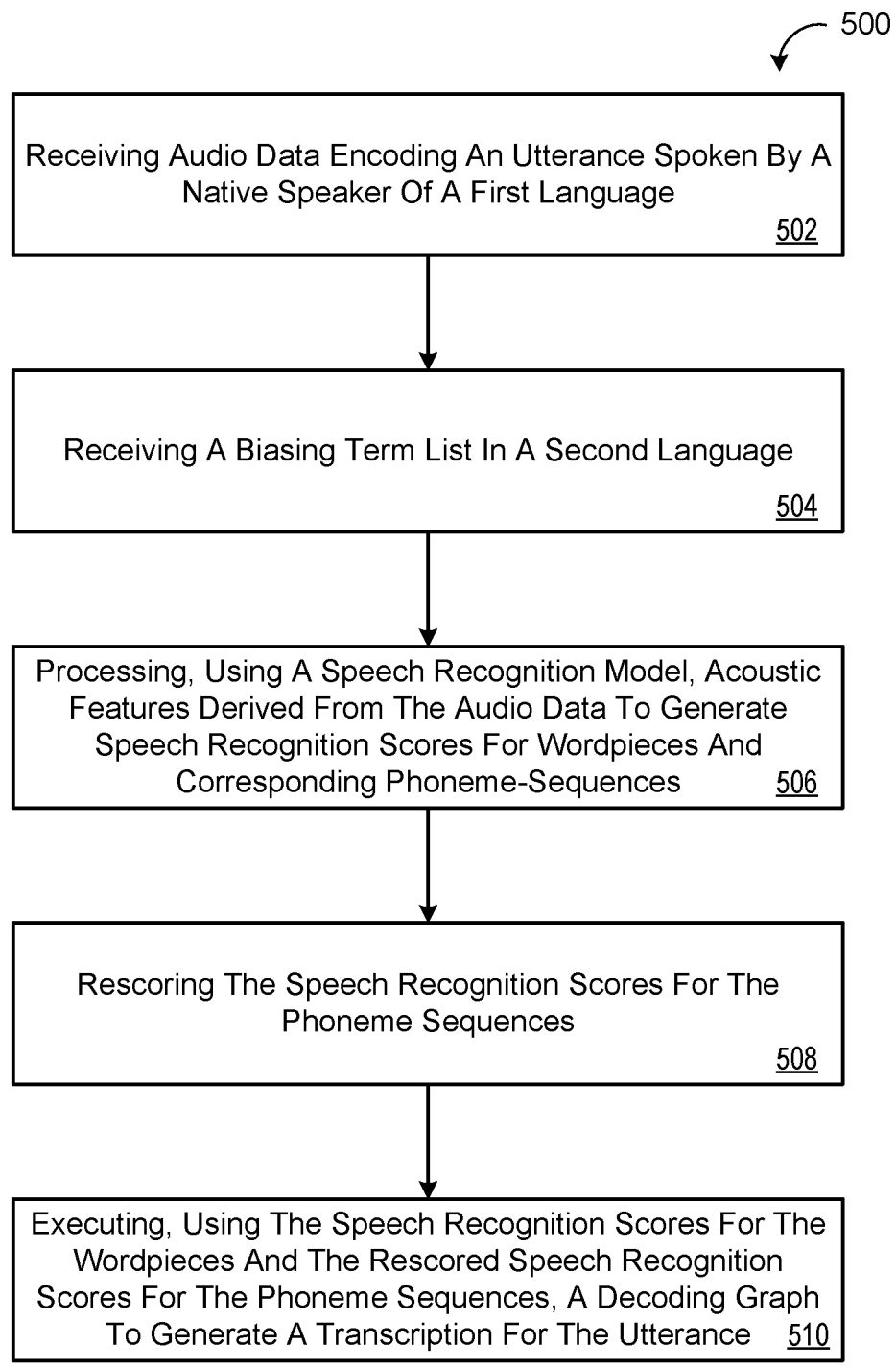
FIG. 5 is a flowchart of an example arrangement of operations for a method of biasing speech recognition results toward terms present in a biasing term list.

FIG. 5 is a flowchart of an example arrangement of operations for a method of contextually biasing a transcription toward foreign terms in a biasing term list. At operation 502, the method 500 includes receiving audio data encoding an utterance 106 spoken by a native speaker 110 of a first language. The utterance 106 may include one or more foreign words of a second language different than the first language. At operation 504, the method 500 includes receiving a biasing term list 105 that includes one or more terms in the second language.

At operation 506, the method 500 also includes processing, using a speech recognition model 200, acoustic features 104 derived from the audio data to generate speech recognition scores for both wordpieces and corresponding phoneme sequences in the first language. At operation 508, the method 500 also includes rescoring the speech recognition scores for the phoneme sequences based on the one or more terms in the biasing term list. At operation 506, the method 500 includes executing, using the speech recognition scores for the wordpieces and the rescored speech recognition scores for the phoneme sequences, a decoding graph 400 to generate a transcription 116 for the utterance 106.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 6:
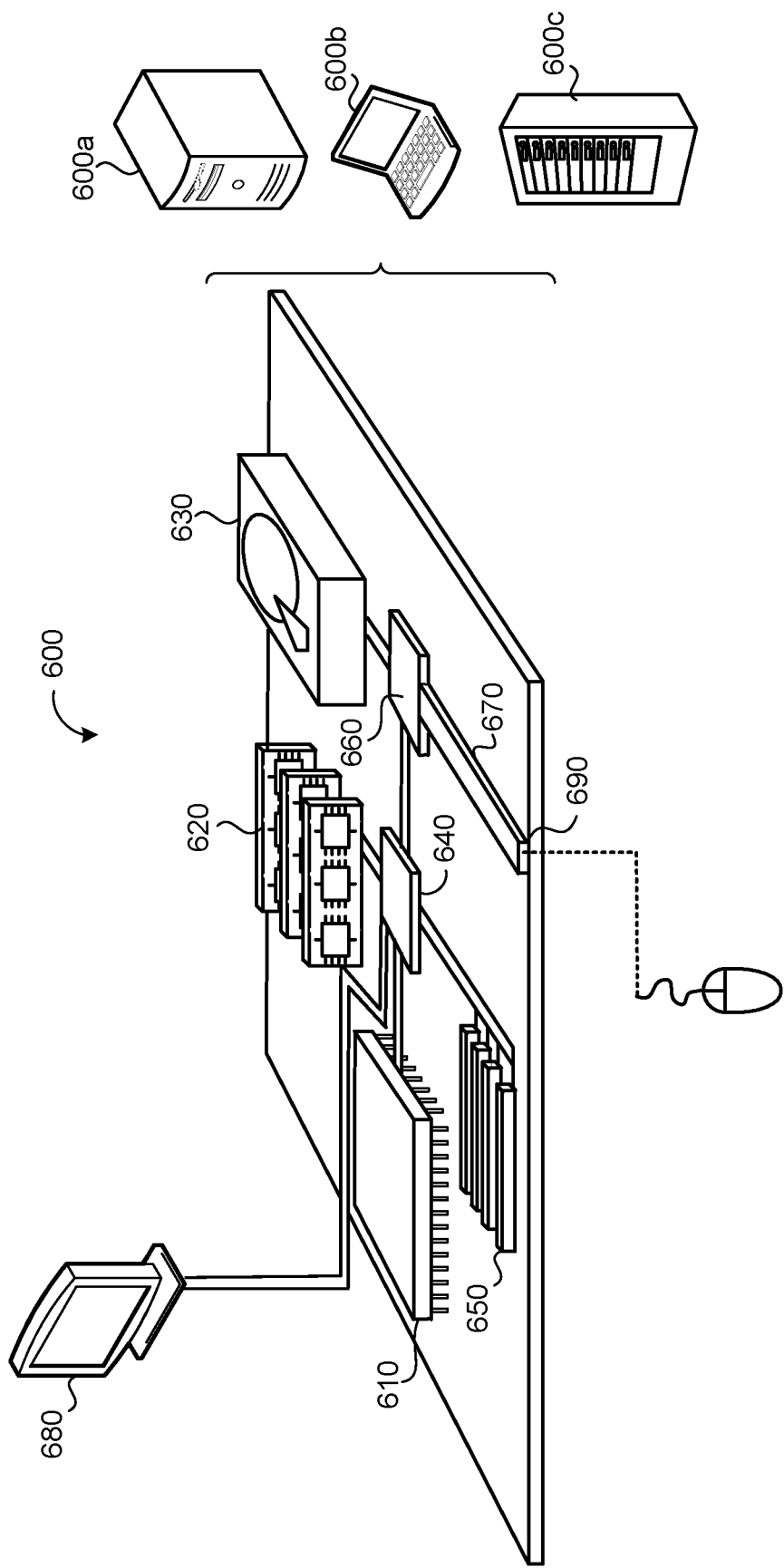
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when received by data processing hardware causes the data processing hardware to perform comprising:
   receiving audio data corresponding to an utterance, the utterance comprising at least one word in a first language and a particular word in a second language different than the first language;
   receiving a biasing term list comprising the particular word in the second language;
   processing, using a speech recognition model, the audio data to generate a plurality of speech recognition hypotheses for the utterance, each speech recognition hypothesis of the plurality of speech recognition hypotheses comprising a corresponding phoneme sequence in the first language and a corresponding speech recognition score;
   rescoring, using one or more terms in the second language from the biasing term list, the corresponding speech recognition scores for the corresponding phoneme sequences in the first language generated by the speech recognition model; and
   using the rescored speech recognition scores for the corresponding phoneme sequences in the first language, executing a decoding graph to output a transcription of the utterance by biasing the transcription to favor inclusion of the particular word in the second language from the biasing term list.

2. The computer-implemented method of claim 1, wherein processing the audio data comprises processing the audio data to generate, as output from the speech recognition model, the corresponding speech recognition scores for the corresponding phoneme sequences in the first language and speech recognition scores for wordpieces in the first language.

3. The computer-implemented method of claim 2, wherein during execution of the decoding graph, the decoding graph is configured to:
   receive, as input, the speech recognition scores for the wordpieces generated as output from the speech recognition model and the rescored speech recognition scores for the corresponding phoneme sequences; and
   generate, as output, wordpieces for inclusion in the transcription of the utterance.

4. The computer-implemented method of claim 1, wherein the speech recognition model comprises an end-to-end, wordpiece-phoneme model.

5. The computer-implemented method of claim 4, wherein the end-to-end, wordpiece-phoneme model comprises a recurrent neural network-transducer (RNN-T).

6. The computer-implemented method of claim 1, wherein the speech recognition model is trained on training utterances in the first language only.

7. The computer-implemented method of claim 1, wherein none of the one or more terms in the second language from the biasing term list were used to train the speech recognition model.

8. The computer-implemented method of claim 1, wherein the data processing hardware and the speech recognition model reside on a user device.

9. The computer-implemented method of claim 1, wherein:
the data processing hardware and the speech recognition model reside on a remote computing device; and
receiving the audio data corresponding to the utterance comprises receiving the audio data corresponding to the utterance from a user device in communication with the remote computing device.

10. The computer-implemented method of claim 1, wherein rescoring the corresponding speech recognition scores for the corresponding phoneme sequences comprises using a biasing finite-state transducer (FST) to rescore the corresponding speech recognition scores for the corresponding phoneme sequences.

11. A system comprising:
data processing hardware; and
memory hardware in communication with the data processing hardware, the memory hardware storing instructions that when executed on the data processing hardware cause the data processing hardware to perform operations comprising:
receiving audio data corresponding to an utterance, the utterance comprising at least one word in a first language and a particular word in a second language different than the first language;
receiving a biasing term list comprising the particular word in the second language;
processing, using a speech recognition model, the audio data to generate a plurality of speech recognition hypotheses for the utterance, each speech recognition hypothesis of the plurality of speech recognition hypotheses comprising a corresponding phoneme sequence in the first language and a corresponding speech recognition score;
rescoring, using one or more terms in the second language from the biasing term list, the corresponding speech recognition scores for the corresponding phoneme sequences in the first language generated by the speech recognition model; and
using the rescored speech recognition scores for the corresponding phoneme sequences in the first language, executing a decoding graph to output a transcription of the utterance by biasing the transcription to favor inclusion of the particular word in the second language from the biasing term list.

12. The system of claim 11, wherein processing the audio data comprises processing the audio data to generate, as output from the speech recognition model, the corresponding speech recognition scores for the corresponding phoneme sequences in the first language and speech recognition scores for wordpieces in the first language.

13. The system of claim 12, wherein during execution of the decoding graph, the decoding graph is configured to:
receive, as input, the speech recognition scores for the wordpieces generated as output from the speech recognition model and the rescored speech recognition scores for the corresponding phoneme sequences; and
generate, as output, wordpieces for inclusion in the transcription of the utterance.

14. The system of claim 11, wherein the speech recognition model comprises an end-to-end, wordpiece-phoneme model.

15. The system of claim 14, wherein the end-to-end, wordpiece-phoneme model comprises a recurrent neural network-transducer (RNN-T).

16. The system of claim 11, wherein the speech recognition model is trained on training utterances in the first language only.

17. The system of claim 11, wherein none of the one or more terms in the second language from the biasing term list were used to train the speech recognition model.

18. The system of claim 11, wherein the data processing hardware and the speech recognition model reside on a user device.

19. The system of claim 11, wherein:
the data processing hardware and the speech recognition model reside on a remote computing device; and
receiving the audio data corresponding to the utterance comprises receiving the audio data corresponding to the utterance from a user device in communication with the remote computing device.

20. The system of claim 11, wherein rescoring the corresponding speech recognition scores for the corresponding phoneme sequences comprises using a biasing finite-state transducer (FST) to rescore the corresponding speech recognition scores for the corresponding phoneme sequences.

* * * * *